US007016303B1

(12) United States Patent
Sakamoto et al.

(10) Patent No.: US 7,016,303 B1
(45) Date of Patent: Mar. 21, 2006

(54) TRANSMITTING METHOD TRANSMITTING SYSTEM AND TRANSMITTER

(75) Inventors: Ichiro Sakamoto, Tokyo (JP); Hiraku Inoue, Kanagawa (JP); Hiroshi Nagasawa, Chiba (JP)

(73) Assignee: Sony Corporation, Tokyo (JP)

( * ) Notice: Subject to any disclaimer, the term of this patent is extended or adjusted under 35 U.S.C. 154(b) by 1210 days.

(21) Appl. No.: 09/660,672

(22) Filed: Sep. 13, 2000

(30) Foreign Application Priority Data

Sep. 14, 1999 (JP) .................................. 11-260908
Jun. 30, 2000 (JP) ............................. 2000-199056

(51) Int. Cl.
*H04L 12/26* (2006.01)
(52) U.S. Cl. ........................ 370/235; 370/230; 370/252
(58) Field of Classification Search ................ 370/230, 370/230.1, 231, 235, 236, 252; 710/100
See application file for complete search history.

(56) References Cited

U.S. PATENT DOCUMENTS

| 5,958,027 | A | * | 9/1999 | Gulick ........................ 710/52 |
| 5,995,488 | A | * | 11/1999 | Kalkunte et al. ........... 370/232 |
| 6,084,934 | A | * | 7/2000 | Garcia et al. ............... 375/370 |
| 6,157,650 | A | * | 12/2000 | Okuyama et al. ........... 370/401 |
| 6,211,800 | B1 | * | 4/2001 | Yanagihara et al. .......... 341/50 |
| 6,229,801 | B1 | * | 5/2001 | Anderson et al. ........... 370/349 |

FOREIGN PATENT DOCUMENTS

EP         0 833 514       4/1998
WO         WO 98 09408     3/1998

OTHER PUBLICATIONS

"1999015 AV/C Command Set for Rate Control of Isochronous Data Flow 1.0" 1394 Trade Association, 'Online! Apr. 18, 2000, pp. 1-32, XP002249721, Retrieved from the Internet: <URL:http://www.1394ta.org/Technology/Specifications/specifications.htm> 'retrieved on Jul. 10, 2003!.

* cited by examiner

*Primary Examiner*—Ricky Ngo
*Assistant Examiner*—Christine Ng
(74) *Attorney, Agent, or Firm*—Finnegan, Henderson, Farabow, Garrett & Dunner, L.L.P.

(57) ABSTRACT

In a network of an IEEE 1394 system or the like, a data transmission rate can be properly controlled by an apparatus to receive the transmitted data. An apparatus for transmitting data is set as a first apparatus and each of one or more apparatus for receiving the transmitted data from the first apparatus is set as an external apparatus. The number of the external apparatuses to which the data are to be transmitted is indicated. A transmission speed is varied upon receipt of a control command from one of the external apparatuses to which a control right is given. The control right is returned when the control command is not given from the external apparatuses to which the data are transmitted for a predetermined period of time. The control right is returned to the first apparatus if there are a plurality of apparatuses to receive the data from the first apparatus.

27 Claims, 15 Drawing Sheets

FIG. 3

| 31 30 29 28 27 26 25 24 23 22 21 20 19 18 17 16 | 15 14 13 12 11 10 9 8 | 7 6 5 4 | 3 2 | 1 0 |
|---|---|---|---|---|
| Data Length | Tag | Tcode | | sy |
| CRC | | | | |
| 0 0 SID | DBS | FN | QPC SPH | RSV | DBC |
| 1 0 FMT | FDF [N] | SYT | | |
| Data(Audio Data) | | | | |
| Data CRC | | | | |

FIG. 4

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| destination ID | | | | | | | | | | | | | imm | spd | | tLabel | | | | | | rt | | tCode | | | | priority | | | |
| source ID | | | | | | | | | | | | | | | | | | | | | | | | | | | | | | | |
| destination Offset High | | | | | | | | | | | | | | | | | | | | | | | | | | | | | | | |
| destination Offset Low | | | | | | | | | | | | | | | | | | | | | | | | | | | | | | | |
| data Lenght | | | | | | | | | | | | | | | | extendedTcode | | | | | | | | | | | | | | | |
| block data (Command) | | | | | | | | | | | | | | | | | | | | | | | | | | | | | | | |

FIG. 5

| | Msb | | | | | | | Lsb |
|---|---|---|---|---|---|---|---|---|
| Opcode | Rate ||||||||
| Operand[0] | Sync Select ||||||||
| Operand[1] | Result ||||||||
| Operand[2] | Plug_Type ||||||||
| Operand[3] | Plug_ID ||||||||
| Operand[4] | Sync_Select_State ||||||||

FIG. 6

| Sync_Select_State | Value | Meaning |
|---|---|---|
| Internal | $00_{16}$ | Transmission AT a Predetermined Route Depending On Internal Clock On Transmitting Side |
| Flow Control | $0F_{16}$ | Transmission Rate Control Based On Command From Receiving Side |

FIG. 7

| Msb | | | | | | | | | | | | | | | Lsb |
|---|---|---|---|---|---|---|---|---|---|---|---|---|---|---|---|
| Bus ID(10 Bits) |||||||||| Node ID(6Bits) ||||||

FIG. 8

| | Msb | | | | | | | Lsb |
|---|---|---|---|---|---|---|---|---|
| Opcode | Rate ||||||||
| Operand[0] | Flow Control ||||||||
| Operand[1] | Result ||||||||
| operand[2] | Plug_Type ||||||||
| Operand[3] | Plug_ID ||||||||
| Operand[4] | Flow_Control_State ||||||||

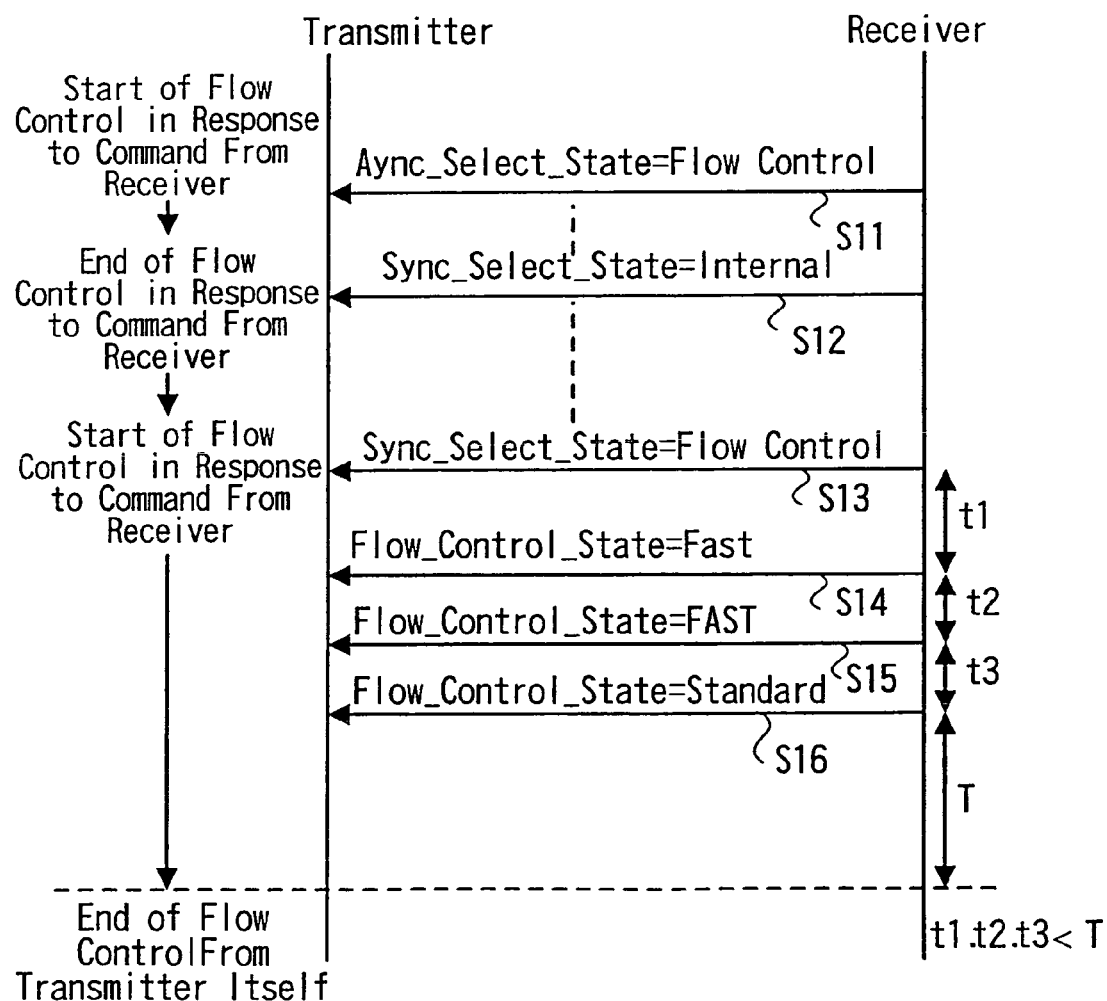

FIG. 16

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 17A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG. 17B oPCR[n]

| on-line | broadcast connection counter | point-to-point connection counter | reserved | channel number | data rate | overhead ID | payload |
|---|---|---|---|---|---|---|---|
| 1 | 6 | 6 | 2 | 6 | 2 | 4 | 10 (bit) |

FIG. 17C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 17D iPCR[n]

| on-line | broadcast connection counter | point-to-point connection counter | reserved | channel number | reserved |
|---|---|---|---|---|---|
| 1 | 6 | 6 | 2 | 6 | 16 (bit) |

# TRANSMITTING METHOD TRANSMITTING SYSTEM AND TRANSMITTER

BACKGROUND OF THE INVENTION

The present invention relates to a transmitting method and a transmitting system for data transmission between apparatuses connected through an IEEE 1394 system bus, for example, and a transmitter to which the transmitting method may be applied.

AV apparatuses are currently capable of mutually transmitting information through a network using an IEEE 1394 system serial data bus. Data transmission is carried out employing such a bus in an isochronous transfer mode. This transfer mode is used for transmitting, in real time, animation data, audio data and the like which comprise a comparatively large amount of data. An asynchronous transfer mode may also be used for transmitting a static image, text data, control command and the like, which have relatively small amounts of data. A special frequency band is used for the transmission in each transfer mode. Therefore, a transmitting operation can be carried out in both modes simultaneously on one bus.

When a relatively large amount of data requiring a comparatively large capacity is to be transmitted in the isochronous transfer mode between a plurality of apparatuses connected through such a bus, it is possible to control the transmission speed of the data from a transmitting source under the control of a receiving apparatus. More specifically, as is shown in FIG. 13 for example, digital data are synchronously transmitted from a transmitter 101 to a receiver 102. As long as the clock rate in transmitter 101 and the clock rate in receiver 102 are coincident with each other, there is no synchronization problem. However, the clock rate for each apparatus usually has some errors, and thus they are usually not precisely coincident. Therefore, it is necessary to carry out some processing to absorb errors between the clock rates. A buffer 103 is provided with receiver 102. A control command is sent in the asynchronous transfer mode from receiver 102 to control or adjust the transmission rate of data from transmitter 101 such that the buffer 103 neither underflows nor overflows.

The data transmitted from transmitter 101 can therefore be correctly received through receiver 102. An AV/C command set may be employed for controlling a transmission rate for transmission from receiver 102 to transmitter 101. The AV/C command set includes commands for controlling an apparatus connected through an IEEE 1394 serial bus, for example. The AV/C command set is standardized with 1394 TA (Trade Association), and the details of the AV/C command are disclosed on the 1394 trade association home page, for example.

In order for receiver 102 to control the transmission rate of data from transmitter 101, it is necessary that each transmitter 101 corresponds to one and only one receiver 102. Only one receiver 102 can transmit a rate control command to a particular transmitter 101. If more than one receiver is connected to the bus when a rate control command sent from any of he receivers connected to the bus, it is also accepted by transmitter 101, an appropriate transmission rate might be disturbed in response to a control command sent from any one or more of the plurality of receivers. Only if transmitter 101 and receiver 102 are in a one to one correspondence can such control can be carried out.

Furthermore, if receiver 102 stops controlling the transmission rate for some reason, such as because of an error, there is a possibility that transmission rate control of transmitter 101 cannot be carried out by the corresponding receiver 102. In such a case, the transmission should be stopped at once so that the rate control can be carried out by other receivers.

OBJECTS OF THE INVENTION

It is an object of the invention to control a transmission rate on the receiving side in a network of an IEEE 1394 system or the like.

It is a further object of the invention to insure a proper transmission rate of data when more than one apparatus is to receive the transmitted data in a network of an IEEE 1394 system or the like.

It is another object of the invention to insure that if a receiving apparatus controlling a data transmission speed of a transmitting apparatus has an error, the transmission speed control is returned to the transmitting apparatus.

SUMMARY OF THE INVENTION

In accordance with the invention, an apparatus for transmitting data is set as a first transmission apparatus. One or more apparatuses for receiving data transmitted from the first apparatus are each set to operate as an external apparatus. The number of external apparatuses to which the data are transmitted is indicated if the transmission speed is to be varied upon receipt of the control command from the external apparatus to which the control right is given. Thus, if only one external apparatus is set, the transmission speed may be requested to be changed. However, if it is indicated that more than one external apparatus are set, the transmission speed may not be varied by any of the set external apparatuses.

In addition, a control right is returned from a particular external apparatus, and is therefore no longer active, when a control command is not sent from the external apparatus that is currently in control of the transmission speed for a predetermined time.

Moreover, if a control command for controlling the data transmission speed, or a control command for any other purpose, is to be issued to the first apparatus, it is issued periodically. Therefore, if there are a plurality of external apparatuses set for receiving data from the first apparatus, the issued control command is ignored, and an additional control command is carried out so that the control right for controlling the operation of the first apparatus is taken away from all of the set external apparatuses, and is returned exclusively to the first apparatus.

Therefore, according to the present invention, even if the first apparatuses and the external apparatus are not in one to one correspondence with each other, the data transmission rate can be controlled if there is only one corresponding external apparatus having the control right and the first apparatus corresponding by one to one.

BRIEF DESCRIPTION OF THE DRAWINGS

FIG. 3 is a diagram illustrating an example of a packet structure of an isochronous transfer packet applied to the invention;

FIG. 4 is a diagram illustrating an example of a packet structure (an example of an asynchronous transfer packet) applied to the invention;

FIG. 5 is a diagram illustrating an example of data to be transmitted as an asynchronous transfer packet according to the invention;

FIG. 6 is a diagram illustrating an example of a sync select state according to the invention;

FIG. 7 is a diagram illustrating an example of an ID structure of each apparatus according to the invention;

FIG. 8 is a diagram illustrating an example of a command during rate control according to the invention;

FIG. 9 is diagram illustrating an example of rate control data according to the invention;

FIG. 10 is a timing chart depicting an example of the rate control state according to the invention;

FIG. 16. FIG. 16 illustrates the structure of a plug control register (PCR) in accordance with the invention;

FIGS. 17(A)–(D) depict the structures of output Master Plug Register (oMPR), output Plug Control Register (oPCR), input Master Plug Register (iMPR) and input Plug Control Register (iPCR) in accordance with the invention;

DETAILED DESCRIPTION OF THE PERFERRED EMBIDIMENTS

Figure 14:
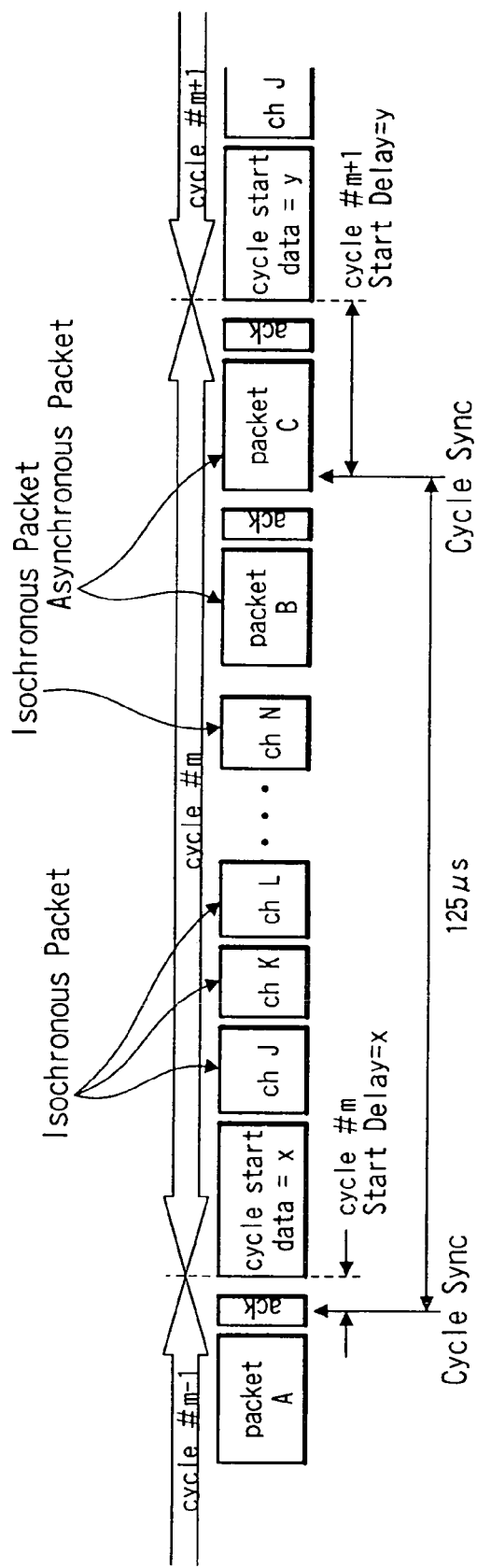
FIG. 14 depicts a cyclic data transmission structure between equipment connected in accordance with the IEEE 1394 standard.

Referring first to FIGS. 14–20, the operation and structure of an IEEE 1394 system will be described. FIG. 14 depicts a cyclic data transmission structure between equipment connected in accordance with the IEEE 1394 standard. In accordance with the IEEE 1394 standard, data are divided into packets and are transmitted in a timesharing scheme employing a cycle time of 125 MS in length. The beginning of each cycle is designated by a cycle start signal supplied from a connected electronic equipment having a cycle-master function. After start of the cycle, data transmission for each of a plurality of channels proceeds in accordance with the time sharing transmission scheme. A fixed length plurality of isochronous packets (noted above as 125 MS) ensures a necessary time band for each transmission channel for transmission of data from the start of every cycle. Thus, the isochronous transmission guarantees a data transmission within a fixed time for each channel, and for the overall data.

However, if a transmission error occurs, data may be lost because there is no data transmission protection mechanism, such as an error correction scheme or the like.

As is further shown in FIG. 14, during a time which is not used for isochronous transmission in each cycle, an attached electronic control equipment that is in charge of controlling information travelling over the bus employing a standard arbitration scheme may send out an asynchronous packet, typically including control commands or the like. Such an asynchronous transmission ensures a secure, error-free transmission by employing an acknowledge and retry transmission scheme, or another error correction scheme. However, because this is an asynchronous transmission scheme, the transmission timing will be uncertain.

So that predetermined attached electronic equipments may perform in accordance with this isochronous transmission scheme, the electronic equipments must correspond to a standard isochronous function definition. Thus, as noted above, at least one of the attached electronic equipments must function as the control device for arbitrating control of the system bus, and thus perform the cycle-master function. Furthermore, at least one of the electronic equipments connected to the IEEE 1394 serial bus must perform an isochronous-resource-manager function.

Figure 15:
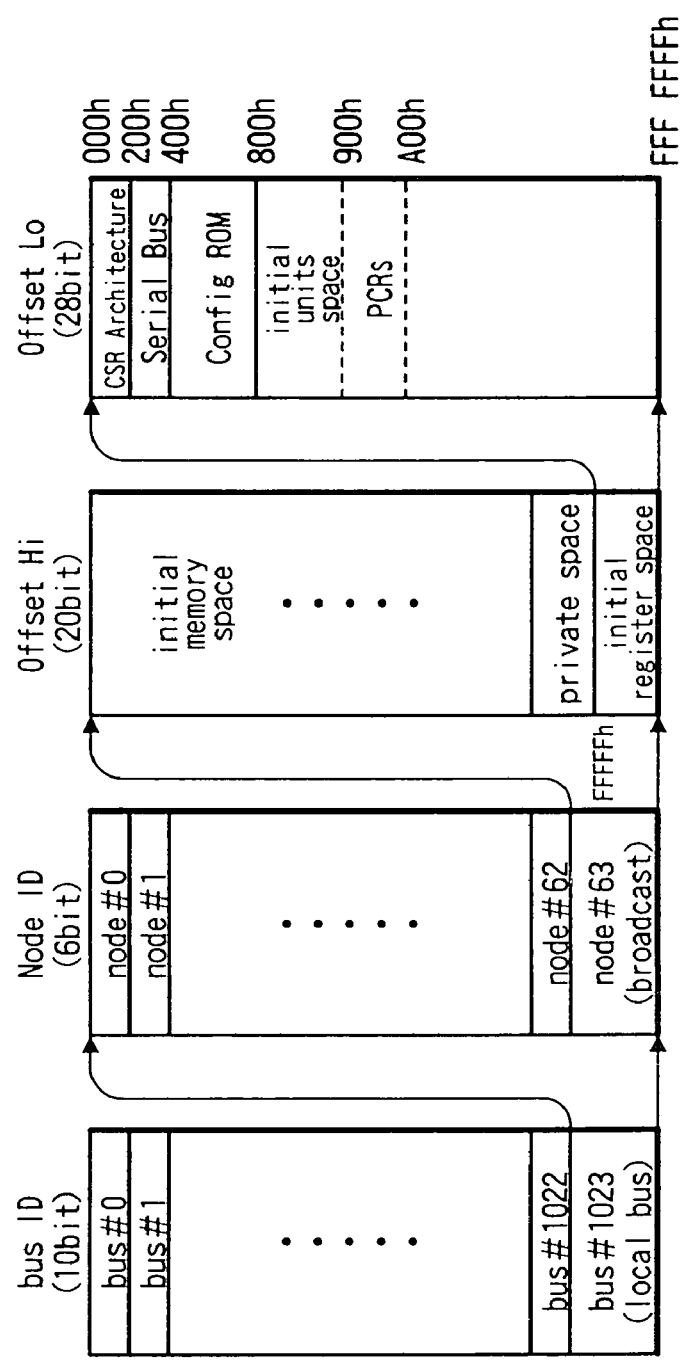
FIG. 15 illustrates a structure of the address space in accordance with a defined CSR architecture in accordance with the invention.

The IEEE 1394 standard is based upon a CSR(Control & Status Register) architecture having an address space of sixty-four bits defined by ISO/IEC 13213. FIG. 15 illustrates a structure of the address space in accordance with the defined CSR architecture. A high order sixteen bits of the address space form a node ID identifying each electronic equipment attached to the IEEE 1394 bus. The remaining forty-eight bits of the address space are used for specifying the portion of the address space reserved for each attached electronic equipment. The high order sixteen bits used for ID are further divided into ten bits of bus ID and six bits of physical ID (node ID in a narrow sense). These Ids can specify 1023 buses and sixty-three pieces of electronic equipment attached to each bus. The value in which all bits are 1 is reserved for a special purpose.

Of the low order forty-eight bits, a space defined by the highest order twenty bits of the address space of 256 terabytes are divided into an Initial Register Space used for a register of 2048 bytes unique to CSR, a register unique to the IEEE 1394 and the like, Private Space and initial Memory Space. A space defined by the low order twenty-eight bits of the low order forty-eight bits is defined in part based upon the definition of the high order twenty bits. If the space defined by the high order twenty bits is initial Register Space, then the low order twenty-eight bits are used as Configuration Read Only Memory, an initial Unit Space used for special purpose unique to an electronic equipment, Plug Control Register (PCRs) and the like.

While each electronic equipment includes a CSR as shown in FIG. 15, a bandwidth available register is only included in the isochronous resource manager. When a bandwidth is not yet allocated for use in an isochronous communication, the maximum value is preserved in the bandwidth available register. Whenever a bandwidth is allocated for use in an isochronous communication, the value in the bandwidth available register decreases an amount equal to the amount of allocated bandwidth. Thus, the bandwidth available register is indicative of the amount of available bandwidth that has not yet been allocated for use in a isochronous communication.

A channels available register is positioned between offset 224h and 228h. The register can include values indicative of channel numbers 0 to 63, respectively. If a bit corresponding to a particular channel is equal to 0, the channel has already been allocated. Only the channels available register of an electronic equipment operating as the isochronous resource manager is valid.

In order to control input and output of data through an interface to and from each equipment, each electronic equipment includes a PCR (Plug Control Register) defined by IEC 61883 in addresses 900 h to 9 FFh within the initial Unit Space shown in FIG. 15. In this manner, a plug is substantiated so as to form signal paths logically similar to an analog interface. FIG. 16 illustrates the structure of a PCR. The PCR has an oPCR (output Plug Control Register) representing an output plug and an iPCR (input Plug Control Register) representing an input plug. Moreover, PCR has an oMPR (output Master Plug Register) and an iMPR (input Master Plug Register) indicative of information on an output plug or input plug.

FIGS. 17 (A) to (D) depict the structures of oMPR, oPCR, iMPR and iPCR: FIG. 17 (A) shows the structure of oMPR; FIG. 17(B) shows the structure of oPCR; FIG. 17(C) shows the structure of iMPR; FIG. 17(D) shows the structure of iPCR, respectively. An area for storing an indication of data rate capability of two bits on the MSB side of oMPR and iMPR stores a code indicating the maximum transmission speed of isochronous data which can be transmitted or received by that equipment. An area for storing an indication of input plug unique to each equipment. Each equipment does not have a plurality of oMPR and iMPR, but is able to have a plurality of oPCR and iPCR corresponding to each individual plug. The PCR shown in FIG. 16 includes thirty-one oPCR and iPCR, respectively, by way of example. A flow of isochronous data is controlled by operating the register corresponding to these plugs. broadcast channel base of oMPR prescribes the channel number used for broadcast output.

An area for storing an indication of the number of output plugs, consuming 5 bits on the LSB side of oMPR stores a value indicating the number of output plugs owned by the relevant equipment, namely, the number of oPCR. An area for storing an indication of the number of input plugs consuming 5 bits on the LSB side of iMPR stores a value indicating the number of input plugs owned by the relevant equipment, namely, the number of iPCR. Areas of non-persistent extension field and persistent extension field are those defined for future extension.

Each area for storing an indication of whether the particular plug is on-line on the MSB side of oPCR and iPCR shows a state of use of the corresponding plug. When the value is 1, this shows that the plug is on-line. When the value is 0, this shows that the plug is off-line. A broadcast connection counter of oPCR and iPCR is also stored, and is indicative of whether the broadcast connection is present (and the value is 1) or not (and the value is 0). An area for storing an indication of each point-to-point connection consumes six bits wide of oPCR and iPCR. A value in this area indicates the number of point-to-point connections owned by the corresponding relevant plug. An area for storing an indication of each channel number consumes six bits of oPCR and iPCR, and indicates the isochronous channel number to which the corresponding relevant plug is connected. An area for storing an indication of the data rate consumes two bits of oPCR, and indicates an actual transmission speed of an isochronous data packet to be output by the corresponding relevant plug. An area for storing an indication of an area of overhead ID consumes four bits of oPCR, and represents a bandwidth of overhead of isochronous communication. An area for storing an indication of the value of a payload consumes ten bits of oPCR, and represents the maximum value of data contained in an isochronous packet that the corresponding relevant plug can handle.

Figure 18:
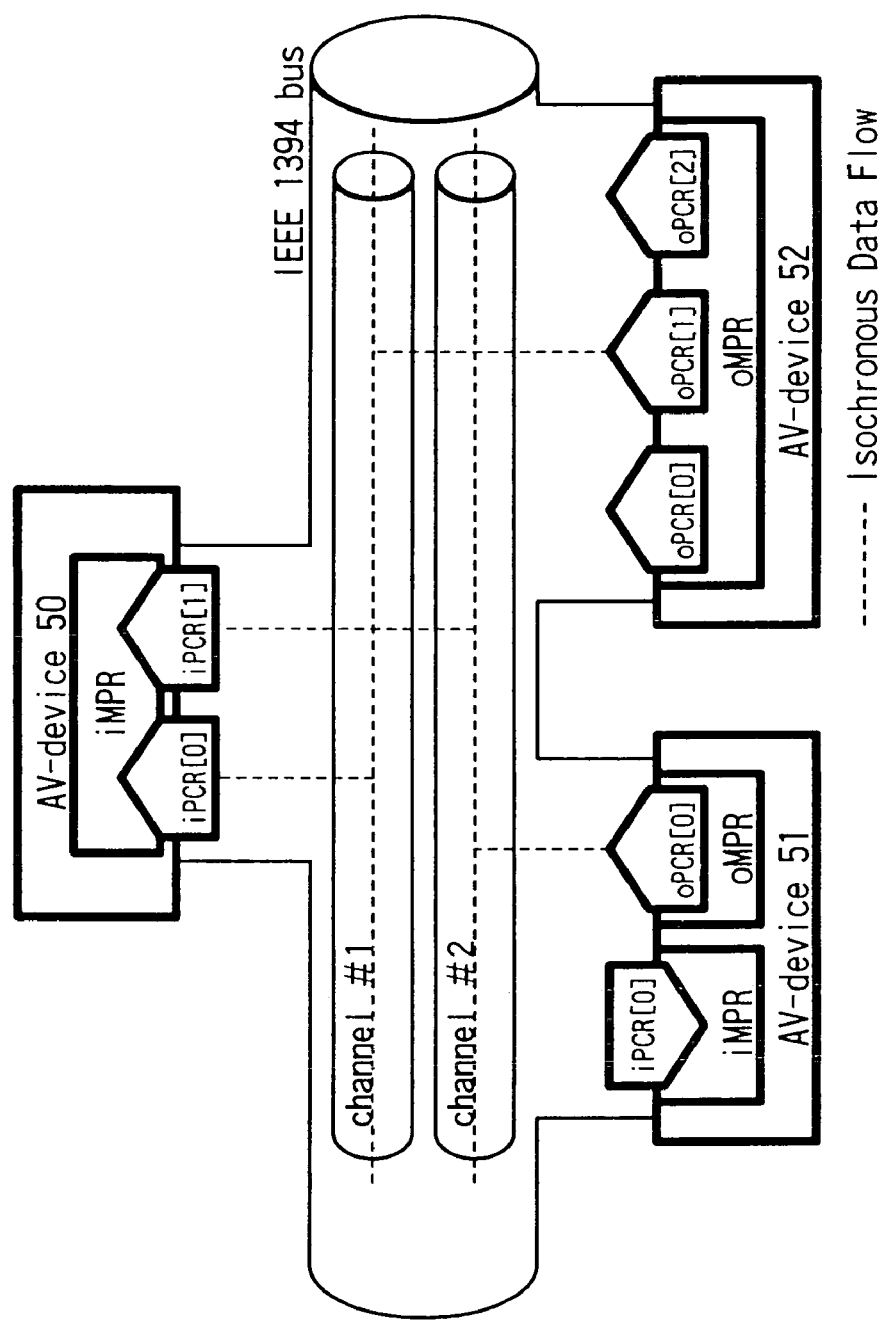
FIG. 18 depicts a relation between a plug, a plug control register and an isochronous channel in accordance with the invention.

FIG. 18 depicts a relation between a plug, a plug control register and an isochronous channel. AV-devices 50, 51 and 52 are connected to each other by means of an IEEE 1394 serial bus. Isochronous data, whose channel is specified by oPCR [1], of oPCR [0] to oPCR [2], and whose transmission speed and number of oPCRs by oMPR of AV-device 52 are defined, is sent out to channel 1 of the IEEE 1394 serial bus. AV-device 50 reads and stores the isochronous data sent out to channel 1 of the IEEE 1394 serial bus. Likewise, AV-device 51 sends out isochronous data to channel 2 specified by oPCR [0], and AV-device 50 reads the isochronous data from channel 2 specified by iPCR [1] and stores it.

Next, an AV/C command set employed in the audio system of the invention will be described making reference to FIGS. 19 and 20.

Figure 19:
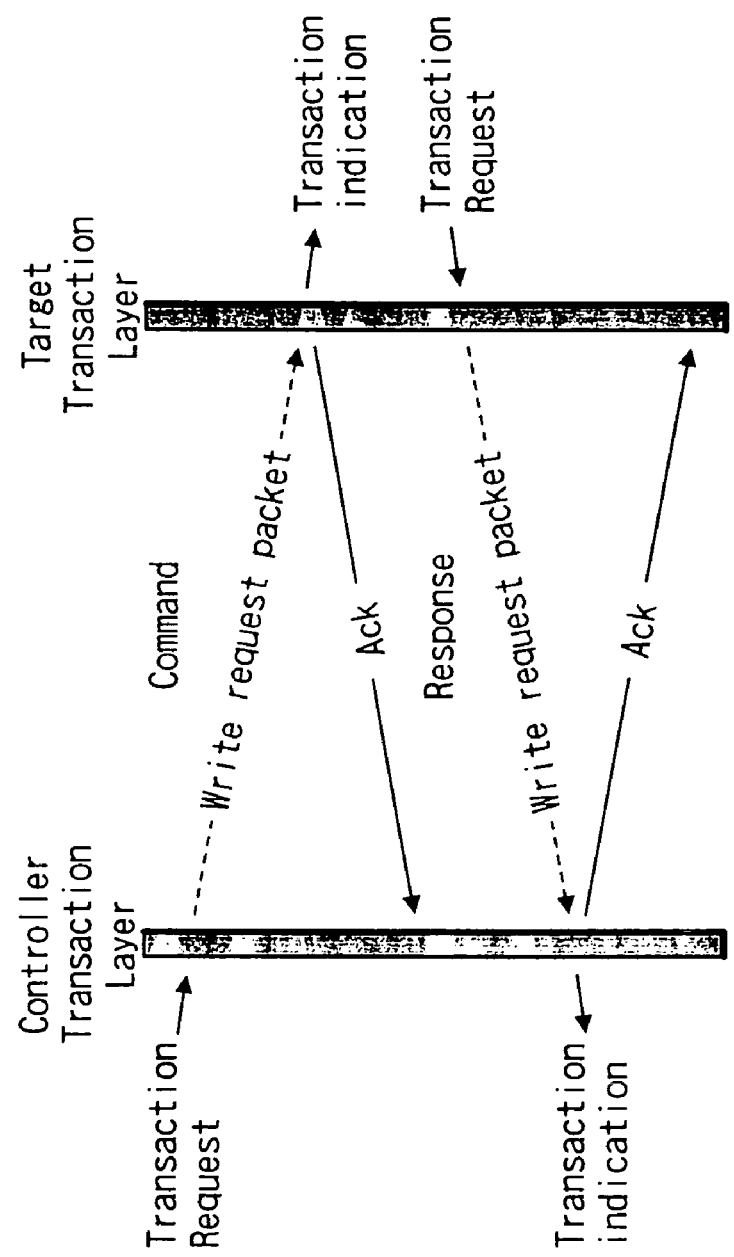
FIG. 19 illustrates a control command and a response transmitted asynchronously in accordance with the invention.

FIG. 19 illustrates a control command and a response transmitted asynchronously. As is shown in FIG. 19, the controlling side of the communication is indicated as being employed on a controller and the controlled side of the communication is indicated as being employed on a target device. Transmission of, and response to a control command is performed between the electronic equipments using a Write Transaction definition of asynchronous transmission in accordance with the IEEE 1394 standard. Upon he receipt of data by the target, an acknowledgement (ACK) is returned to the controller for confirming the data reception.

Figure 20:
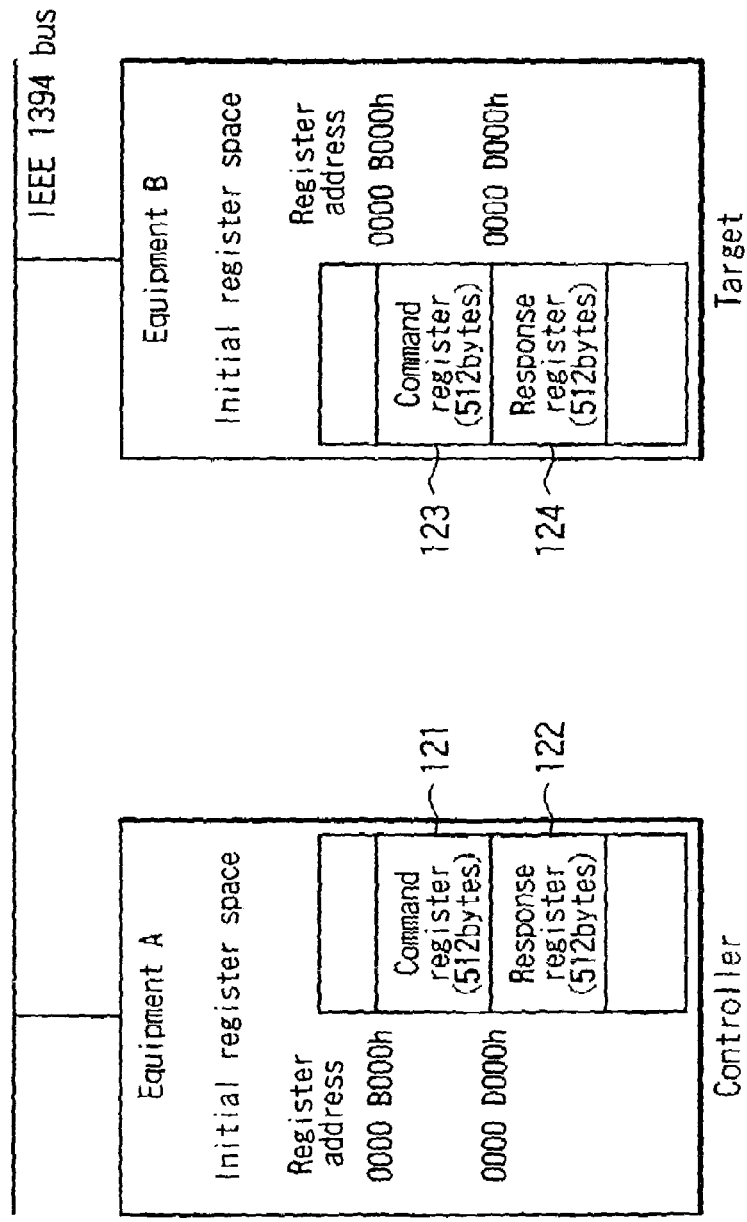
FIG. 20 illustrates in more detail the relation between the control command and the response shown in FIG. 19 in accordance with the invention.

FIG. 20 illustrates in more detail the relation between the control command and the response shown in FIG. 19. An electronic equipment A is connected with an electronic equipment B through an IEEE 1394 bus. In this example, the electronic equipment A acts as the controller and the electronic equipment B acts as the target. The electronic equipment A and the electronic equipment B both have, respectively, a command register and a response register, each consuming 512 bytes. As is shown in FIG. 20, the controller communicates a command by writing a command message into the command register 123 of the target. Inversely, the target communicates a response to the controller by writing a response message into the response register 122 of the controller. The control information is thus exchanged by the two messages as a pair.

An embodiment of the invention will now be described making reference to FIGS. 1 to 12.

Figure 1:
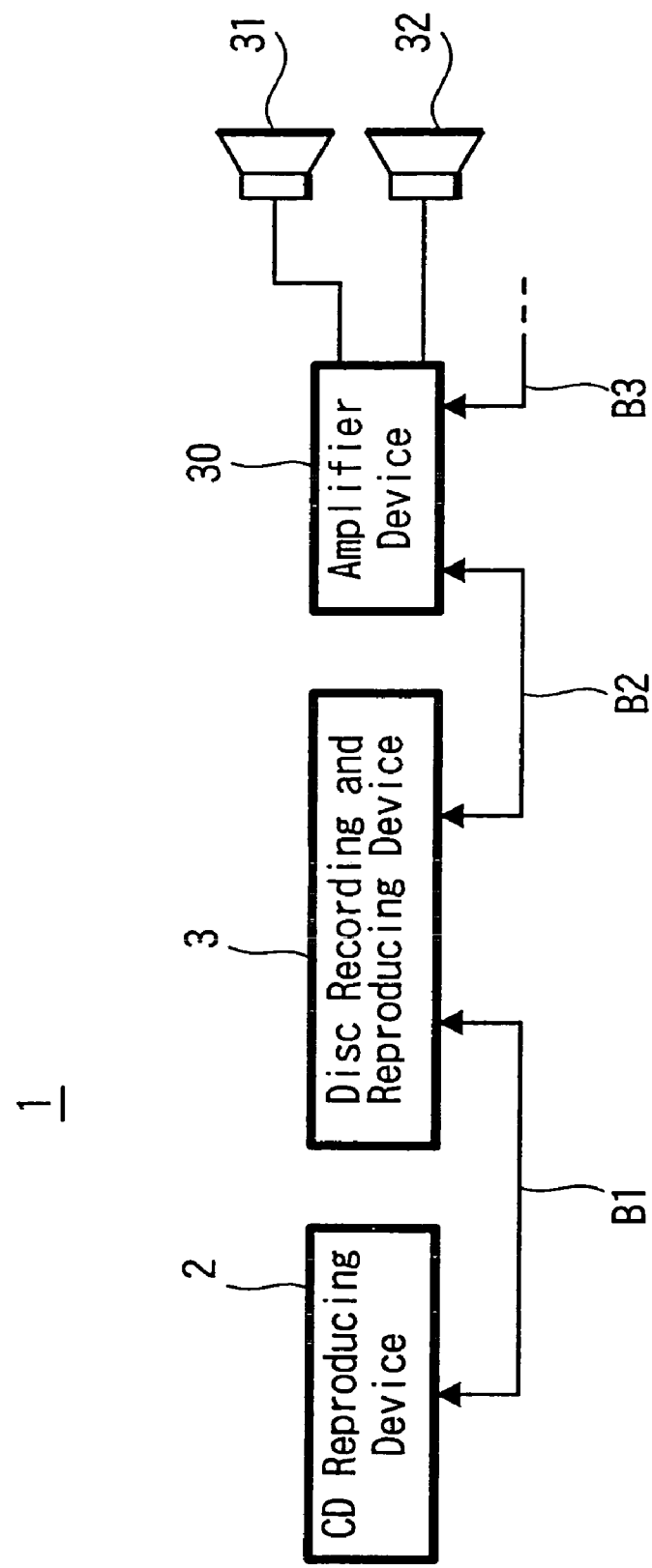
FIG. 1 is a block diagram depicting an example of the whole structure of an audio system according to the invention.

FIG. 1 is a block diagram depicting the overall structure of an audio system according to an embodiment of the invention. An audio system 1 transmits a digital audio signal reproduced by a compact disc reproducing device 2 to a disc recording and reproducing device 3. Recording and reproducing device employs an optical magnetic disc (or an optical disc) which is referred to as a mini disc or the like, and records the received signal thereon. Moreover, the digital audio signal reproduced by the compact disc reproducing device 2 is also transmitted to an amplifier device 30. Amplifier device 30 sends an audio signal to right and left speaker devices 31 and 32 which are connected to the amplifier device 30. Compact disc reproducing device 2, disc recording and reproducing device 3 and amplifier device 30 are connected through bus lines B1 and B2 defined by an IEEE 1394 interface system, described generally above. In the case of the IEEE 1394 interface system, the sequence of connections between the devices may be carried out in any order. FIG. 1 merely depicts an example connection sequence. Furthermore, it is also possible to carry out the connection, through another bus line B3, to other audio apparatuses (or a video apparatus and a computer device that use an audio signal) which are not shown.

Figure 2:
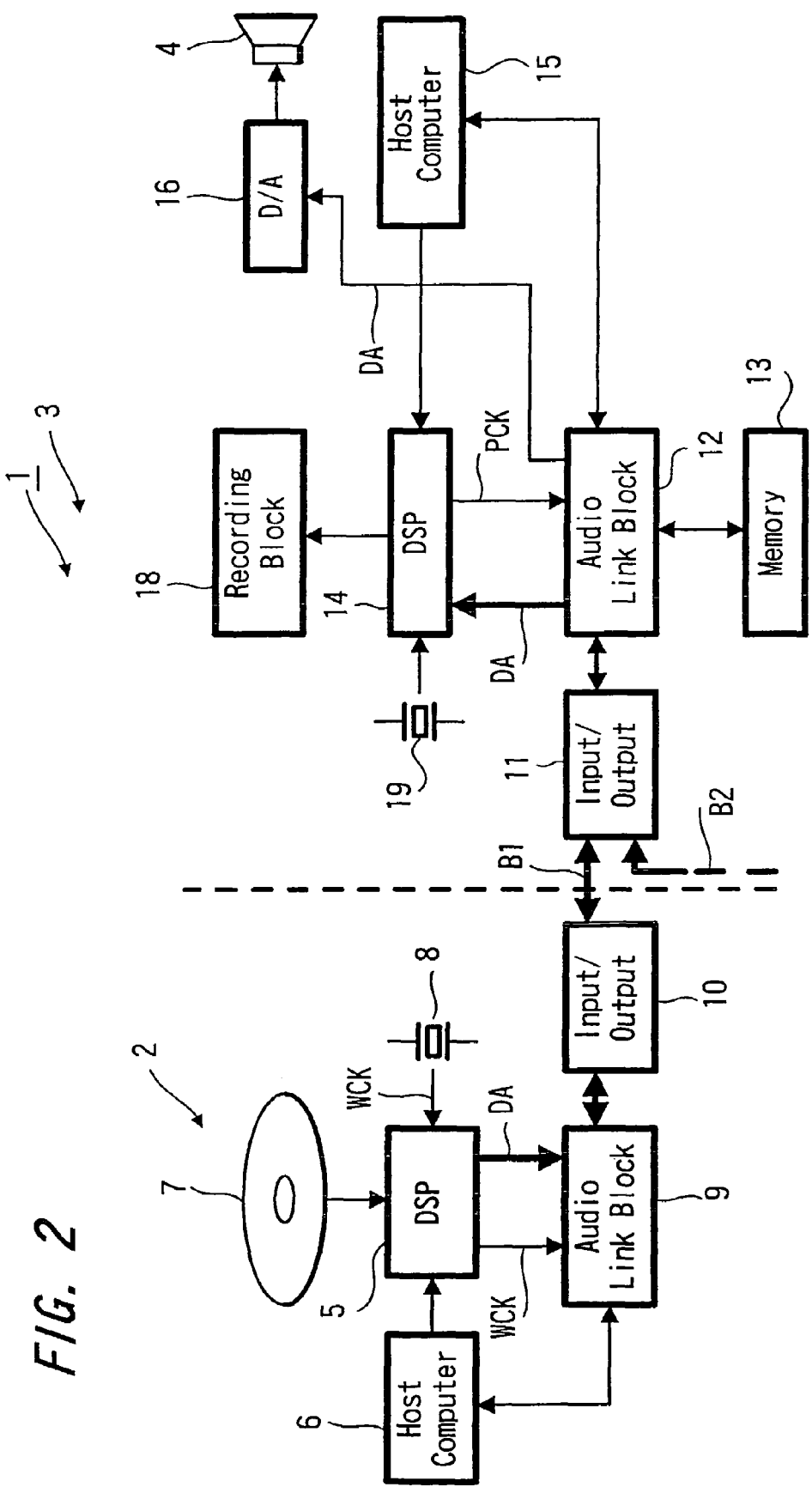
FIG. 2 is a block diagram depicting the details of the audio system according to the invention.

FIG. 2 is a block diagram depicting in greater detail the structures of compact disc reproducing device 2 and disc recording and reproducing device 3 in the audio system according to the invention. In compact disc reproducing device 2, a digital signal processor (DSP) 5 rotates and drives an optical disc 7, formatted and functioning as a digital audio disc, through the control of a host computer 6. A digital audio signal DA recorded on the optical disc 7 is reproduced and output. Digital signal processor 5 also generates a clock WCK in accordance with a built-in crystal oscillator 8 and reproduces digital audio signal DA synchronously with the generated clock signal WCK. The reproduced digital audio signal DA is output to an audio link block 9. Digital signal processor 5 reproduces recorded information from compact disc 7 at a reproducing speed according to the instruction of host computer 6, and outputs the digital audio signal DA. In accordance with the invention, in addition to being set to an ordinary reproducing speed, the reproducing speed can be set to be a double speed, a fourfold speed, an eightfold speed and a sixteenfold. Moreover, after one of the noted reproducing speeds is set, a fine adjustment to the reproducing rate varying by one or several % (for example, approximately 1%) can also be made.

Audio link block 9 forms packets of digital audio signal DA under the control of host computer 6. Audio link block also controls an input/output circuit 10 and sends packets of digital audio signal DA to disc recording and reproducing device 3. Moreover, audio link block 9 acquires incoming input packet information through input/output circuit 10, and sends the contents of the packet to host computer 6 if necessary.

Input/output circuit 10 carries out parallel/serial conversion for data to be output from audio link block 9. Input/output circuit 10 also adds predetermined data, and carries out bi-phase mark modulation to prepare the output data. Input/output circuit 10 then outputs the modulated data to bus line B1. Consequently, input/output circuit 10 superimposes the clock WCK necessary for the reproduction of the packet at a receiving side on the packet input from audio link block 9 and transmits the same to a bus "BUS". Moreover, input/output circuit 10 monitors the packets transmitted through bus line B1 and acquires any packet specifying the compact disc reproducing device 2 as a receiving device. Input/output circuit 10 decodes any acquired packet, carries out serial/parallel conversion of the packet data, and outputs the packet thus processed to audio link block 9.

Compact disc reproducing device 2 and disc recording and reproducing device 3 are connected to each other through bus line B1 defined by the IEEE 1394 interface standard. Audio link block 9 and input/output circuit 10 generate packets of data from digital audio signal DA in a format similarly defined by the IEEE 1394 and notify host computer 6 of the data transmitted in each packet. More specifically, digital audio signal DA is transmitted with real time properties maintained as an isochronous transfer packet defined by the IEEE 1394 interface standard. Other data such as various control commands are transmitted as asynchronous transfer packets asynchronously at any time. The asynchronous transfer packet is used for one-to-one communication between two devices in which addresses for the transmitting and receiving apparatuses that are the sources of the data are indicated.

FIG. 3 is a diagram depicting a part of an isochronous transfer packet to be used for transmission of an audio signal. In such an isochronous packet, a header including a synchronous pattern "sy", a packet code "tcode", a channel "channel", a tag "tag", a data length "data length", and an error correcting code CRC are allocated from the head portion to a 32×2 bit. A count value DBC of continuous packets obtained when data having a predetermined size are divided and allocated to each packet, a reserve RSV, a marker SPH indicative of the presence of a source packet header, the number of divisions FN of a source packet, a data block size DBS, a self-identification code SID and the like are allocated to a next 32 bits. A recording region SYT such as a time stamp, a data sampling frequency FDF for transmission, a transmission format FMT and the like are allocated to a next 32 bits. Data to be transmitted, including source data are allocated to another subsequent region in 32 bit units. An error correcting code CRC is added to the end of this portion of the isochronous transfer packet.

In accordance with the invention, a flag N is added to the 8 bit indication of the data sampling frequency FDF section of this portion of the isochronous transfer packet (one bit on a position enclosed by a broken line in FIG. 3). Flag N indicates that the transmission rate of the audio signal able to be controlled by a receiving apparatus. When the flag N is a "1" signal, it is indicated that the transmission rate may be controlled. When the flag N is a "0" signal, it is indicated that the transmission rate may not be controlled or adjusted by an attached receiving apparatus. In the following description, the mode set for controlling the transmission rate will be referred to as a flow control mode.

FIG. 4 is a diagram showing an asynchronous transfer packet to communicate a control command between two apparatuses connected to a bus. The apparatuses communicate in a one to one relationship. Input-output circuit 10 sets the address, etc. indicating its own node and a bus number or the like on the packet when the packet is to be transmitted. More specifically, the first 32 bits of the packet include data indicative of a priority level "priority" of the packet, a code "tCode" of the packet, a retry code "rt" of the packet, a label "tLabel" allocated to the packet, a transmission speed "spd" and identification data "imm" indicative of the relationship with the continuous packet and a destination ID indicating the destination node of the packet on the bus. Moreover, "destination Offset High and destination Offset Low" data for specifying the address of the transmitting node and "source ID" data indicative of the node of the transmitting source and the bus are allocated. Furthermore, a data length "dataLength" of the data to be transmitted is allocated to the data to be transmitted.

In accordance with the invention, audio link block 9 inputs a packet intended for one other connected apparatus for one to one communication therewith. The packet is received by input/output circuit 10, which in turn notifies host computer 6 of the data within the packet. Thus, host computer 6 is notified of various control commands transmitted from disc recording and reproducing device 3 to compact disc reproducing device 2.

Host computer 6 comprises a computer for controlling the action of compact disc reproducing device 2 and the operation of digital signal processor 5 in response to the manipulation of a manipulator provided on the operation panel of the compact disc reproducing device 2. Consequently, in this manner information recorded on optical disc 7 is reproduced.

When data is to be reproduced from optical disc 7, and the reproduced digital audio signal DA is to be transmitted to disc recording and reproducing device 3, host computer 6 controls the operation for reproducing data from compact disc 7 according to control commands that are issued upon receipt of a control command sent from disc recording and reproducing device 3 through audio link block 9. More specifically, when host computer 6 inputs a control command for finely adjusting a reproducing rate for the reproduction of information from disc recording and reproducing device 3, digital signal processor 5 receives an instruction to bring a reproducing state of the compact disc 7 into a corresponding state. Moreover, when host computer 6 inputs a control command for switching the reproducing speed of disc recording and reproducing device 3, digital signal processor 5 receives an instruction for switching the reproducing speed according to the received command. Consequently, compact disc reproducing device 2 serves to vary an amount of data reproduced per unit time, and to transmit the digital audio signal DA under the control of disc recording and reproducing device 3.

During the operation of disc recording and reproducing device 3, input/output circuit 11 monitors data packets transmitted through bus lines B1 and B2 and acquires any one of the monitored packets specifying disc recording and reproducing device 3 as the receiving device in the same manner as input/output circuit 10 of compact disc reproducing device 2. After being acquired, input/output circuit 11 reproduces the acquired packet and notifies audio link block 12 of the identity and information of the packet thus reproduced. At this time, input/output circuit 11 detects the data transmitted from bus lines B1 and B2 synchronously with a predetermined clock and reproduces the data in each of the transmitted packets.

In the case that audio data received within the isochronous data transfer packet, used for the transmission of audio data, is to be received in a transmission mode (internal mode) in which the data transmission speed is not to be controlled, which is not the above-mentioned flow control mode, reproduction processing is carried out synchronously with the transmitted audio data by referring to a time stamp provided in recording region SYT. However, when data is to be reproduced in the flow control mode, as noted above, data reproduction may be carried out without referring to the time stamp provided in recording region SYT. Also in the flow control mode, data reproduction may be carried out by using the time stamp when a synchronous processing can be carried out by referring to the time stamp.

Audio link block 12 of disc recording and reproducing device 3 thereafter acquires the received packet from input/output circuit 11 and stores the digital audio signal DA from the same packet in the recording region of the digital audio signal DA in memory 13. Moreover, audio link block 12 outputs digital audio signal DA stored in memory 13 to digital signal processor 14 or a digital analog converting circuit (D/A) 16 under the control of host computer 15. The operation for reading digital audio signal DA from memory 13 may also be stopped upon the transmission of from memory 13.

In accordance with a series of processing steps, audio link block 12 records the digital audio signal DA in memory 13 in accordance with clock WCK superimposed on the input data. The input data is synchronous with clock WCK of compact disc reproducing device 2, and then reads digital audio signal DA in response to clock RCK output from digital signal processor 14 and outputs the signal that is read out.

A recording block 18 comprises a driving mechanism for rotating and driving a disc, and a recording and reproducing system such as an optical pick-up. The recording and reproducing system sequentially forms a mark on the optical magnetic disc in response to a recording signal output from digital signal processor 14. Digital signal processor 14 controls the operation of recording block 18, and generates and outputs a recording signal in response to the digital audio signal DA output from audio link block 12. In disc recording and reproducing device 3, the digital audio signal DA is recorded on the disc through digital signal processor 14 and recording block 18.

Digital signal processor 14 generates, in accordance with a built-in crystal oscillator 19, a high precision clock RCK which is asynchronous with clock WCK of compact disc reproducing disc 2. Digital signal processor 14 then processes the digital audio signal DA output from audio link block 12 on the basis of clock RCK. Clock RCK is also output to recording block 18, digital analog converting circuit 16 and audio link block 12.

Digital analog converting circuit 16 comprises a so-called 1-bit digital to analog converting circuit for converting the digital audio signal DA into an analog signal in accordance with a PWM modulation system. Digital analog converting circuit generates an audio signal converted into an analog signal and drives a speaker 4 connected to the disc recording and reproducing device.

Host computer 15 comprises a computer for controlling the operation of disc recording and reproducing device 3. The host computer also serves to control the operation of digital signal processor 14 or the like in response to the manipulation of manipulator provided on the operation panel of disc recording and reproducing device 3. In this manner, digital audio signal DA is recorded on the disc, or is output through the speaker 4.

When digital audio signal DA transmitted from compact disc reproducing device 2 is to be processed, host computer 15 transmits a control command to compact disc reproducing device 2 in response to an amount of data of digital audio signal DA stored in memory 13. Thus, flow control processing is carried out by variably controlling the amount of data of digital audio signal DA per unit time that is transmitted from compact disc reproducing device 2 in response to amount of data of digital audio signal DA stored in memory 13.

Next, processing for carrying out flow control according to the invention will be described. When an audio signal reproduced by compact disc reproducing device 2 is to be transmitted to disc recording and reproducing device 3, and is in turn to be recorded to the disc (optical magnetic disc) in the disc recording and reproducing device 3, it is assumed that flow control processing is carried out for the data to be transmitted from compact disc reproducing device 2 under the control of the disc recording and reproducing device 3, acting as a receiver of the information, in a manner as noted above. For simplicity of the description, compact disc reproducing device 2 will be referred to as a reproducing device 2 and disc recording and reproducing device 3 will be referred to as a recording device 3.

FIG. 5 is a diagram depicts a structure of control data to be used to perform flow control processing. This control data is transmitted from recording device 3 to reproducing device 2 via an asynchronous transfer packet. The data shown in FIG. 5 is provided in the interval reserved for block data (command) of the asynchronous transfer packet shown in FIG. 4. The data comprises a command from an AV/C command set. First, data indicative of a rate command [RATE] which is an instruction code for controlling the transmission rate (transmission speed) of the data is sequentially provided in an [opcode] interval of the commend data. Next, data indicative of a subfunction [SYNC SELECT] for synchronous selection is provided in an interval of operand [0]. Data indicative of a control result [result] are provided in an interval of operand [1]. Data indicative of a specification of a data input and output plug [plug type] are provided in an interval of operand [2]. Data indicative of a plug ID [plug id] for inputting and outputting of the data are provided in an interval of operand [3]. Data indicative of the specification of the start and end of transmission speed control [sync select state] are provided in an interval of operand [4].

The data included within the [sync select state] data of operand [4] specifies a toggle between an internal mode [INTERNAL], in which a reproduction process relies upon an internal clock, and a flow control mode [FLOW CONTROL], in which a reproduction process relies upon a clock provided by another device, as shown in FIG. 6.

When reproducing device 2, acting as a data transmission device, accepts an instruction for which the flow control mode is specified based on the data stored as the command indicative of the [sync select state], the ID of the receiver (recording device 3) is recorded thereby. Reproducing device subsequently accepts a transmission speed control instruction from the receiver having an ID that matches the stored ID. Once the control of the transmission speed, based upon the flow control mode is completed, the receiver (recording device 3) issues an instruction specifying that the transmission device should return to data reproduction based upon the internal transmission mode by providing such an instruction in the data in the [sync select state] data. When the transmitter (reproducing device 2) receives the instruction, it discards the stored ID, and therefore internally controls the data transmission speed thereof. Thus, when an ID is stored, the transmitter gives a control right for controlling the data transmission speed to the apparatus (recording device 3) whose ID is stored with the transmitting device.

FIG. 7 depicts an example of an apparatus ID included in the transmitted data. The apparatus ID comprises a 10-bit bus ID and a 6-bit node ID. The transmitter (reproducing device 2) determines the bus ID and the node ID (or only the node ID, if this is all that is required) which are included in a packet to be transmitted.

FIG. 8 is a diagram depicting the structure of data to be transmitted as an asynchronous transfer packet when the flow control mode is set. The data shown in FIG. 8 are provided as the block data (command) of the asynchronous transfer packet shown in FIG. 4. The data comprises a particular command from the AV/C command set. First of all, data indicating a rate command instruction [RATE] for controlling the transmission rate (transmission speed) of the data are provided in the [opcode] interval of the command data. Next, [FLOW CONTROL] data necessary for flow control are provided in the operand [0] interval. Data indicating a [flow control state] for specifying a data transmission speed are provided in the operand [4] interval. The remainder of the information provided in FIG. 8 is similar to that of FIG. 5 in that [result] data indicative of a control result are provided in the operand [1] interval, [plug type] data for specifying the data input and output plugs are provided in the operand [2] interval, and [plug id] data indicative of the plug ID for inputting and outputting data are provided in the operand [3] interval.

The [flow control state] data in the operand [4] interval may be set to any of a standard speed [STANDARD], a speed [FAST] of +1% of the standard speed and a speed [SLOW] of −1% of the standard speed, as is shown in FIG. 9. When reproducing device 2, which is the apparatus that is to transmits data, receives [flow control state] data, the transmission speed (transmission rate) of the audio signal to be transmitted through the isochronous transfer packet is controlled based on the flow control data specified. More specifically, a standard transmission speed is set when a [STANDARD] speed instruction is included, a speed of +1% of the standard speed is set when a [FAST] instruction is included, and a speed of −1% of the standard speed is set when a [slow] instruction is given.

FIG. 10 depicts an example of an instruction sequence for transmitting a speed instruction from the receiver (recording device 3) to the transmitter (reproducing device 2) according to the invention. First, an AV/C command shown in FIG. 5 is sent from the receiver (recording device 3), and data indicative of the flow control mode [FLOW CONTROL] are set according to the [sync select state] data of operand [4] (Step S11).

When the control data are received and accepted by the transmitter (reproducing device 2), reproducing device 2 stores the ID of recording device 3 and gives a control right to recording device 3. Thus, recording device 3 acquires the control right. Based on a predetermined flag (the flag N in the packet shown in FIG. 3) in the isochronous transfer packet, which is the packet including the audio signal transmitted from recording device 3, it is determined that recording device 3 has acquired the control right.

Once the control right is acquired by a particular receiving device, a command such as that shown in FIG. 8 is issued based on a possible receiving state of the receiver (recording device 3). Thus, instructions indicating a standard speed, a standard speed +1%, or a standard speed −1% are given. The speed in the transmitter (reproducing device 2) is adjusted accordingly. When the control right is given to one particular apparatus, any flow control instructions sent from another apparatus (amplifier device 30 shown in FIG. 1, for example) connected to the bus are rejected by transmitter (reproducing device 2). When the flow control mode is completed, and thus ended in the receiver (recording device 3), a command such as that shown in FIG. 5 is sent from the receiver (recording device 3) including an instruction ending the flow control mode and relinquishing the flow control (Step S12). At this time, data for specifying the end of the transmission speed control are provided in the [operand 4] interval of the command shown in FIG. 5. When control data are thus transmitted, the control right is returned to the transmitter (reproducing device 2) so that the ID stored in the recording device 3 is discarded. Once the control right is returned, another apparatus connected to the bus may acquire the control right so that the speed of the audio signal to be transmitted can be controlled by another apparatus.

As shown in Steps S11 and S12 of FIG. 10, if the flow control mode is to be continued for a long time, the speed instruction is continuously provided. As shown in Step S13 of FIG. 10, for example, it is assumed that the AV/C command shown in FIG. 5 in accordance with the flow control mode is sent from the receiver (recording device 3) to acquire the control right. At this time, a command indicative of a speed instruction such as that shown in FIG. 8 is issued and is transmitted from recording device 3 to reproducing device 2 at a time t1 within a preset period T (for example, T indicates five seconds) after the command is transmitted (Step S14). In the example of FIG. 10, the [FAST] instruction is sent at Step S14 and a speed of +1% of the standard speed is set for the data transmission. The next speed instruction is given at a time t2(Step S15) within the preset period T (Step S15). The speed instruction at Step S15 may be the same or different than the prior speed instruction. In the example shown in FIG. 10, the instruction of [FAST] is continuously given. Thereafter, a next speed instruction given at a time t3 within the preset period T (Step S16) indicates a standard speed.

As far as a command is regularly transmitted within the preset period T, such as once every five seconds, the control right acquired by the receiver is maintained by the receiver. Accordingly, even if the speed instruction to be transmitted is the same as the prior speed instruction, it is necessary to repetitively issue the speed control command in a cycle within the period T on the receiver side so that control is maintained by the receiver.

When the period T ends after the control command is transmitted at Step S16 of FIG. 10, for example, the control right given to the receiver from the transmitter (reproducing device 2) is canceled because of a lack of response, and the control right is returned to the transmitter. When the control right is canceled, flow control mode ends and the internal mode is set so that the transmission speed is controlled by processing in the transmitter (reproducing device 2). Therefore, even if the processing for ending flow control and returning the control right to the transmitter cannot be properly carried out on the receiver side for some reason, the control right is automatically returned to the transmitter side once a predetermined period o time has elapsed in which a flow control command is not received. Thus, other apparatuses can thereafter carry out flow control, as necessary.

Figure 11:
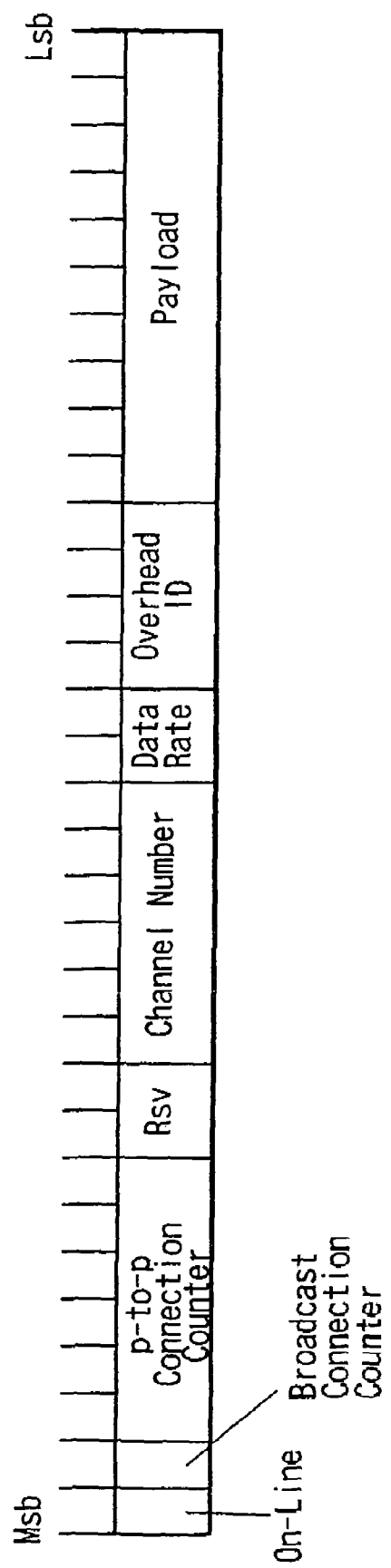
FIG. 11 is a diagram depicting a data structure illustrating an example of the data arrangement of a p-to-p connection counter according to the invention.

Data to be transmitted from the transmitter (reproducing device 2) onto the bus includes data indicative of the number of apparatuses to which the data are to be transmitted. As shown in FIG. 11, for example, the transmitted data comprises 32 bits, including [on-line] data indicating whether or not synchronous data can be output, and [broadcast connection counter] data indicating whether or not broadcast is being carried out. The transmitted data also includes [p-to-p (point-to-point) connection counter] data indicative of the number of apparatuses to which the data are to be transmitted in a one to one relationship, and [channel number] data indicative of a channel number for outputting synchronous data. The transmitted data further includes [data rate] data indicative of the transmitting capability of a bus to be employed for the transmission, [payload] data indicative of the maximum data size which can be transmitted in one synchronous data packet, and [overhead ID] data indicative of a necessary band.

The data of the p-to-p connection counter is indicative of the number of apparatuses to which the data are to be transmitted in a one to one relationship. The p-to-p connection counter is to count a value that is increased by one every time the number of the apparatuses that are to receive a particular data transmission is increased by one. Therefore, when the counter value is 2 or more, it is indicated that there are two or more receiving devices to receive a transmitted data in a one to one relationship.

Figure 12:
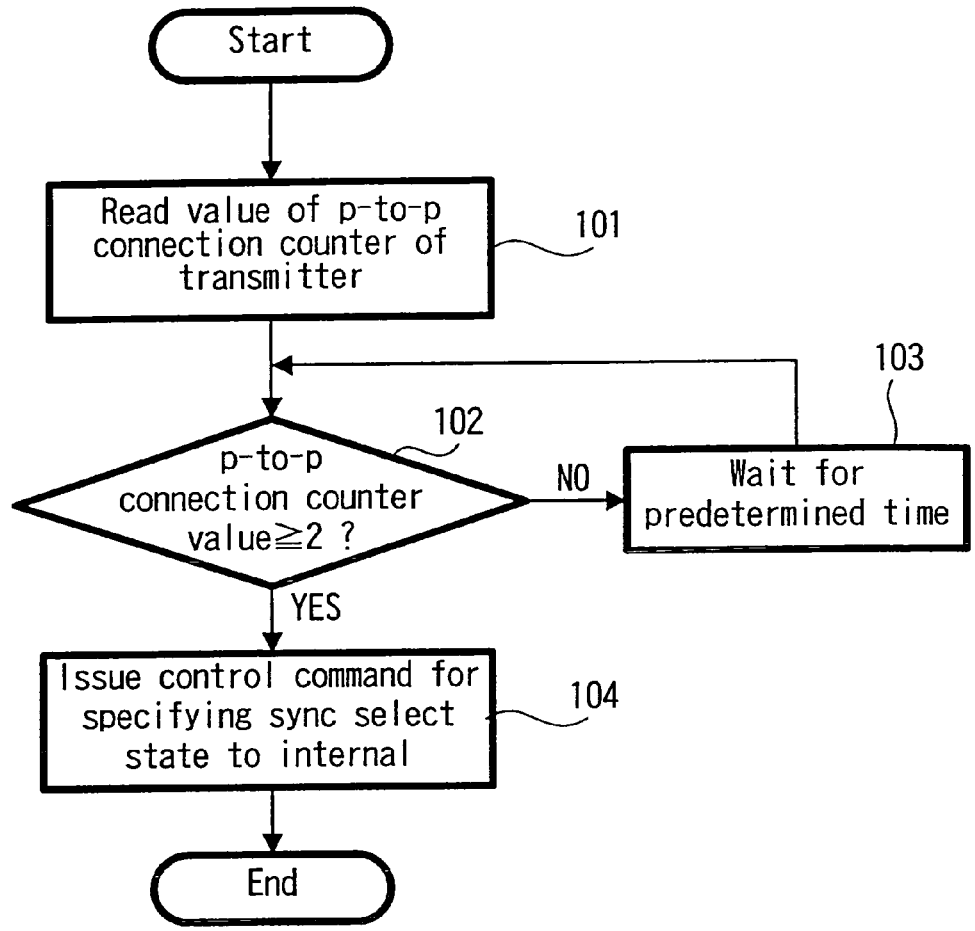
FIG. 12 is a flow chart depicting an example of control in which a p-to-p connection counter is used according to the invention.
Figure 13:
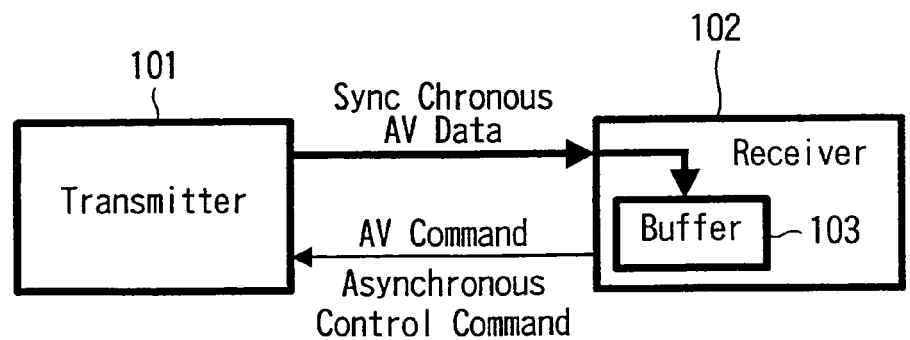
FIG. 13 is a diagram depicting an example of a structure in which conventional transmission rate control is to be carried out.

An example of processing to be carried out on the receiver side employing the data of the connection counter will be described with reference to a flowchart shown in FIG. 12. First, the receiver determines the value stored in the p-to-p connection counter in the data transmitted from the transmitter when the control right is acquired by the receiving device (Step 101). It is then determined whether the value thereof is 2 or more (Step 102). If the value is less than 2, a predetermined amount of time is waited, during which time flow control is performed by the receiving device, and the routine then returns to the determination of Step 101.

When it is determined that the value stored in p-to-p connection counter is 2 or more at Step 102, a control command specifying that the internal mode [INTERNAL] should be used by the transmitting device to determine the transmission speed of the data is issued. The flow control mode for controlling the data transmission speed by the receiving device is thus ended (Step 104). Therefore, when it is determined that more than one receiver is to receive the same transmitted synchronous data, the flow control mode is ended and an instruction for setting the internal mode is given. Consequently, when a plurality of apparatuses are to receive the same synchronous data (audio signal) at the same time, it is possible to prevent the improper receiving state of the other apparatuses under the control of only one apparatus. Thus, a request for a particular transmission speed from a particular receiving device will not be allowed. This is because such a requested speed might not be able to be received by one of the other receiving devices. Moreover, the other apparatuses can be prevented from being eliminated from receiving the data.

In the example shown in FIG. 1, for instance, when the audio signal reproduced from reproducing device 2 and transmitted to the bus is required to be received by the amplifier device 30 while it is currently being received by the recording device 3 and being recorded on the disc thereof, the flow control mode is released so that the same audio signal can be received by both the recording device 3 and the amplifier device 30 without error.

While the transmission speed is controlled when the audio signal is to be transmitted in the embodiment described above, it is a matter of course that the same control can be carried out also in the case that other data such as a video signal are to be transmitted and the amount of data transmission per unit time is to be controlled.

While the case of the network utilizing an IEEE 1394 system bus has been described in the above embodiment, the present invention can also be applied to the case that the same data transmission is to be carried out between apparatuses employing other network structures.

Therefore, according to the invention, when there are a plurality of apparatuses that are to receive data that is transmitted to a bus, one apparatus on the receiving side is not permitted to control the transmission rate. Rather, a standard transmission rate is employed so that each apparatus on the receiving side can correctly receive the transmitted data. Moreover, in the case that the apparatus having the control right has an error, the apparatus on the transmitting side is returned into the internal control state. Therefore, all apparatuses on the receiving side can correctly receive the transmitted data.

What is claimed:

1. A data transmitting method for transmitting data at a variable transmission rate between apparatuses connected to a bus line, comprising the steps of:

receiving a transmission rate control command at a transmitting apparatus, said transmitting apparatus comprising one of said apparatuses connected to said bus line;

determining if the transmission rate control command is being sent only from a particular predetermined receiving apparatus to which has been given transmission rate control, said particular predetermined receiving apparatus being among said apparatuses connected to said bus;

detecting if there is at least another receiving apparatus among the apparatuses connected to the bus line that is to receive transmitted data; and transmitting data on the bus line at a rate based upon the transmitting rate specified in the transmitted transmission rate control command if the transmitting rate control command data is determined to have been sent from the particular predetermined receiving apparatus to which has been given transmission rate control;

wherein the data is transmitted at a predetermined rate regardless of any rate control command data received by the transmitting apparatus if it is detected that there is at least another receiving apparatus among the apparatuses connected to the bus line that is to receive the transmitted data.

2. The data transmitting method of claim 1, further comprising the step of giving the transmission rate control command to only one of the apparatuses connected to the bus line.

3. The data transmitting method of claim 2, further comprising the step of retrieving the transmission rate control right from the one of the apparatuses after the transmission rate control command data is transmitted.

4. The data transmitting method of claim 2, further comprising the step of automatically taking the transmission control right from the one of the apparatuses if a transmission rate control command data is not received from the one of the apparatuses for a predetermined period of time.

5. The data transmitting method of claim 2, wherein the transmission rate control command data is sent to the transmitting apparatus during each of a plurality of predetermined time intervals while it is necessary to control the rate of data.

6. The transmitting method of claim 1, further comprising the step of canceling the transmission rate control right of the particular predetermined receiving apparatus if another receiving apparatus to receive the transmitted data is detected.

7. The data transmitting method of claim 1, further comprising the steps of:

packetizing data to be transmitted; and adding data indicating that the transmission rate control command data is accepted by the transmitting apparatus that will transmit the packetized data.

8. The data transmitting method of claim 1, further comprising the steps of:

acquiring the transmission rate control right at the receiving apparatus when the rate of the data to be transmitted from the transmitting apparatus should be controlled; and sending the transmission rate control command data to the transmitting apparatus after the transmission rate control right is received.

9. A data transmitting system for transmitting data at a variable transmission rate between apparatuses connected to a bus line, comprising:

a receiving apparatus among the apparatuses connected to the bus line to which a transmission rate control command is given, for sending a transmission rate control command data to the bus line; and a transmitting apparatus among the apparatuses connected to the bus line for receiving the transmission rate control command data and for transmitting data on the bus line, said transmitting apparatus comprising determining means for determining if the transmission rate control command is being sent only from a particular predetermined receiving apparatus to which has been given transmission rate control, said particular predetermined receiving apparatus being among said apparatuses connected to said bus line;

receiving apparatus detecting means for detecting if there is at least another receiving apparatus among the apparatuses connected to the bus line that is to receive transmitted data; and transmission means for transmitting data on the bus line at a rate based upon the transmitting rate specified in the transmitted transmission rate control command if the transmitting rate control command data is determined to have been sent from the particular predetermined receiving apparatus to which has been given transmission rate control;

wherein the transmission means transmits the data at a predetermined rate regardless of any rate control command data received by the transmitting apparatus if the receiving apparatus detecting means detects that there is at least another receiving apparatus among the apparatuses connected to the bus line that is to receive the transmitted data.

10. The data transmitting system of claim 9, wherein the transmitting apparatus further comprises control means for giving the transmission rate control command to only one of the receiving apparatuses connected to the bus line.

11. The data transmitting system of claim 10, wherein the transmission apparatus further comprises retrieving means for retrieving the transmission rate control right from the one of the apparatuses after the transmission rate control command data is received.

12. The data transmitting system of claim 10, further comprising lapsing means for automatically taking the transmission control right from the one of the receiving apparatuses if a transmission rate control command data is not received from the one of the receiving apparatuses for a predetermined period of time.

13. The data transmitting system of claim 10, wherein the transmission rate control command data is sent to the transmitting apparatus during each of a plurality of predetermined time intervals while it is necessary to control the rate of data.

14. The transmitting system of claim 9, further comprising canceling means for canceling the transmission rate control right of the particular predetermined receiving apparatus if another receiving apparatus to receive the transmitted data is detected by the receiving apparatus detecting means.

15. The data transmitting system of claim 9, further comprising packetizing means for packetizing data to be transmitted, wherein the transmitting means of the transmitting apparatus transmits the packetized data as the transmitted data.

16. The data transmitting system of claim 15, wherein the packetizing means adds indicating that the transmission rate control command data is accepted by the transmitting apparatus that will transmit the packetized data.

17. The data transmitting system of claim 9, further comprising:

acquiring means for acquiring the transmission rate control right at the receiving apparatus when the rate of the data to be transmitted from the transmitting apparatus should be controlled; and command sending means for sending the transmission rate control command data to the transmitting apparatus after the transmission rate control right is received.

18. A data transmitting apparatus for transmitting data at a variable transmission rate to at least one apparatus via a bus line, comprising:

data receiving means for receiving data on the bus line;

determining means for determining if transmission rate control command data is being sent only from a particular predetermined receiving apparatus to which has been given transmission rate control;

receiving apparatus detecting means for detecting if there is at least another receiving apparatus connected to the bus line that is to receive transmitted data; and transmitting means for transmitting data on the bus line at a rate based upon the transmitting rate specified in the transmitted transmission rate control command if the transmitting rate control command data is determined to have been sent from the particular predetermined receiving apparatus to which has been given transmission rate control;

wherein the transmitting means transmits the data at a predetermined rate regardless of any rate control command data received by the transmitting apparatus if it is detected that there is at least another receiving apparatus connected to the bus line that is to receive the transmitted data.

19. The data transmitting apparatus of claim 18, further comprising control means for giving the transmission rate control command to only one of a plurality of apparatuses connected to the bus line.

20. The data transmitting apparatus of claim 19, further comprising retrieving means for retrieving the transmission rate control right from the at least one apparatus after the transmission rate control command data is transmitted.

21. The data transmitting apparatus of claim 20, wherein the retrieving means does not retrieve the transmitting rate control right from the at least one receiving apparatus within a predetermined period of time after the transmitting rate control command data is received.

22. The data transmitting apparatus of claim 21, wherein the retrieving means does not retrieve the transmitting rate control right from the receiving apparatus while the data receiving means receives the transmitting rate control command data periodically.

23. The data transmitting apparatus of claim 19, wherein said control means gives an instruction for ending the transmitting rate control right of the to said one of said plurality of apparatuses.

24. The data transmitting apparatus of claim 18, further comprising lapsing means for automatically taking the transmission control right from the at least one apparatus if a transmission rate control command data is not received from the at least one apparatus for a predetermined period of time.

25. The data transmitting apparatus of claim 18, further comprising retrieving means for canceling the transmission rate control right of the at least one receiving apparatus if another receiving apparatus to receive the transmitted data is detected by the receiving apparatus detecting means.

26. The data transmitting apparatus of claim 18, further comprising packetizing means for packetizing data to be transmitted, and wherein the transmitting means transmits the packetized data as the data.

27. The data transmitting apparatus of claim 26, wherein the packetizing means adds data indicating that the transmission rate control command data is accepted by the transmitting apparatus that will transmit the packetized data.

* * * * *